Jan. 31, 1967  R. L. SLATER ET AL  3,300,836
METHOD OF MAKING BIMETALLIC BEARING MATERIAL
Filed April 30, 1965
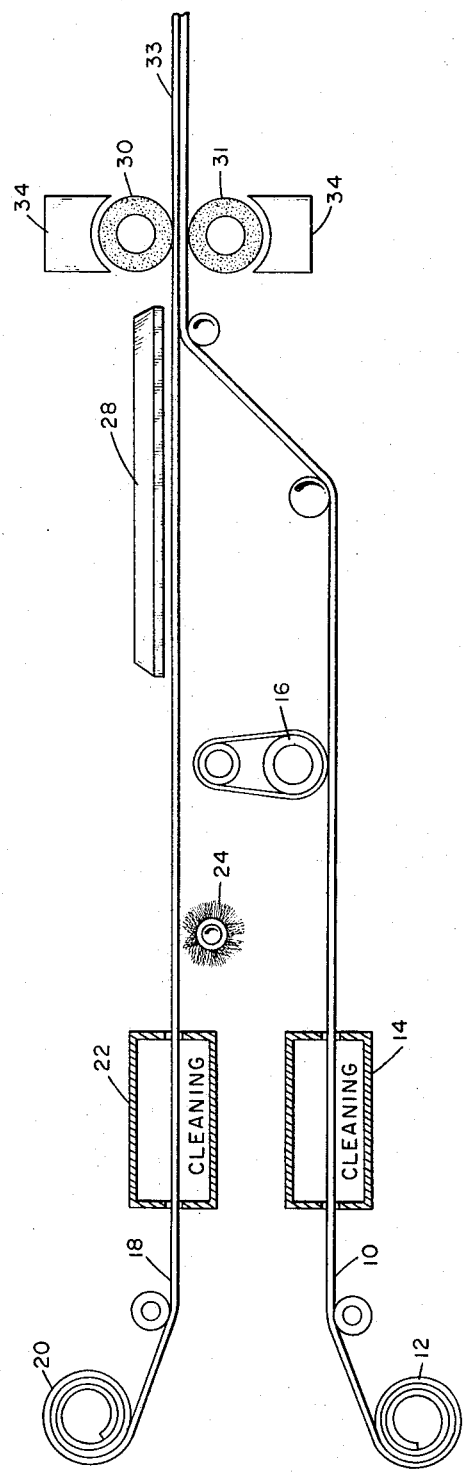
INVENTORS
RAYMOND L. SLATER
WILLIAM F. FISHER
BY
ATTORNEY

United States Patent Office 3,300,836
Patented Jan. 31, 1967

3,300,836
METHOD OF MAKING BIMETALLIC BEARING MATERIAL
Raymond L. Slater, Novelty, and William F. Fisher, Cleveland, Ohio, assignors to Clevite Corporation, a corporation of Ohio
Filed Apr. 30, 1965, Ser. No. 452,057
4 Claims. (Cl. 29—149.5)

The present invention pertains to a method for making a bimetallic strip particularly useful for making sleeve type bearings, and is related to the invention disclosed in United States Letters Patent 3,093,885, issued June 18, 1963, in the names of Wilbert W. Morrison and Donald W. Williams, for Method for Making a Bimetallic Strip for Bearings, assigned to the same assignee as the present invention. More particularly, the present invention pertains to a method for cladding an aluminum alloy strip having a low tin content directly onto a steel strip by a continuous method wherein the steel strip is at ambient temperature and ambient atmosphere.

The aluminum alloy of this invention has a low tin content in order to provide a reasonably strong bearing material, and it has other materials such as a small amount of copper, silicon and nickel to enhance the strength properties. As has been known, it is difficult to bond a tin-aluminum alloy to steel. Consequently, in the prior art many patents deal with intermediate bonding layers between the aluminum alloy and the steel. In the present invention the aluminum alloy is bonded directly to the steel layer.

In the aforesaid Patent 3,093,885 the aluminum alloy layer is directly bonded to the steel layer, but at least the steel layer had to be heated prior to the step of rolling the strips together. Whenever the steel layer is preheated, extreme care must be exercised to prevent its hot surface from reacting with contaminants and forming a surface layer which prevents a good bond to the aluminum. To prevent the hot surface of the steel layer from reacting, a controlled atmosphere was used in the preheating furnace. In the present application the steel is not preheated, and consequently a protective atmosphere is not required.

United States Letters Patent 2,782,498 discloses directly cladding aluminum or aluminum alloy to steel without an intermediate layer, and without preheating the steel. No particular alloy is disclosed in this patent. British Patent 741,995 deals with the very difficult problem of bonding high-tin aluminum alloy to steel, and it solves the problem by the use of an intermediate layer of nickel, silver, copper or pure aluminum, and by using very hot rolls. In United States Letters Patent 3,078,563 an alloy somewhat similar to the aluminum alloy used in the present method is clad on steel, but in the method disclosed in the patent the steel layer had to be preheated and a protective atmosphere had to be used. In any event, the prior art has not disclosed an inexpensive method for continuously directly cladding tin aluminum alloy of the herein disclosed type to steel without preheating the steel in a protective atmosphere.

It is an object of the present invention to directly roll clad a strip of tin aluminum alloy to a steel strip without preheating the steel strip in a protective atmosphere.

It is another object of the present invention to roll clad a tin aluminum alloy directly to steel at a low temperature, there being no preheating of the steel, and there being at most only slight heating of the rolls.

An aspect of the invention lies in the method of making a bimetallic strip and sleeve bearings therefrom, wherein a layer of tin-aluminum alloy is roll clad directly onto a layer of steel, there being no intermediate layer to enhance the bond between the aluminum alloy layer and the steel layer. In order to assure a good bond, both of the layers are cleaned and severely abraded at their bonding surfaces, and if any preheating of the strip material is desired it is limited to the aluminum alloy strip. The steel strip is not preheated and consequently it does not have to be provided with a special protective atmosphere. The aluminum alloy layer, even if preheated to about 800° F., does not have to be protected by a special protective atmosphere. The strips are then passed through pressure rolls which are maintained at a temperature within the range of 250–600° F., and the roll pressure is such that the thickness of the aluminum alloy layer is reduced between 40 and 70%. This clads the aluminum alloy strip to the steel strip, and thereafter it can be re-rolled, then annealed and cut into sections and sleeve bearings can be formed. The bond between the strips is such that severe forming of the bimetal layer, even to form flanged bearings, will not disrupt the bond.

For a better understanding of the present invention, together with other and further objects thereof, reference is had to the following description taken in connection with the accompanying drawings, and its scope will be pointed out in the appended claims.

In the drawing there is shown diagrammatically a continuous method of directly roll cladding alumium alloy to steel in accordance with this invention.

In carrying out the process of this invention, steel of the type commercially known as SAE 1010 or 1008 may be used as the backing member, though the invention is not limited to these two steel alloys. Low carbon steel is preferred since it endures a greater rolling reduction which results in an improved bond. It has lower initial hardness and is less subject to cold working during cladding and forming.

The aluminum alloy should consist of 4 to 10% tin, 0.5 to 2% copper, 0.2 to 2% nickel, 0.2 to 8% silicon, and iron 0 to 0.7%, the balance being aluminum except for impurities in small amounts. An important alloy for this process comprises 5 to 7% tin, 0.7 to 1.3% copper, 0.2 to 0.8% nickel, 1 to 2% silicon, and iron not over 0.7%, the balance being aluminum except for impurities in small amounts. Titanium and manganese in the amount of 0.1% each can be tolerated.

In preparing the steel for the bonding operation a strip 10 is unwound from a coil 12 and cleaned by means of a vapor degreaser 14, or aqueous cleaning solution, as is known in the art, and passed under a wire brush apparatus 16 or preferably a belt sander which abrades the bonding surface thereof to cut rather than to burnish the surface.

The aluminum alloy layer 18 is simultaneously unwound from a coil 20, and it is cleaned in cleaner 22 and its bonding face is wire brushed by device 24 in a manner somewhat similar to the brushing of the steel layer. A lighter brush pressure may be applied because the aluminum is softer.

The layers are fed between pressure rollers 30, 31 where sufficient pressure is exerted to reduce the thickness of the aluminum layer between 40 and 70%, thereby to effect a strong bond between the layers. The rolls 30, 31 are heated by heaters 34 to a temperature within the range 250 to 600° F.

An important aspect of the invention lies in the face that the steel strip 10 is not preheated. It is rolled at ambient temperature, which may be in the range of 65 to 100° F., and because it is not preheated as has usually been done, a protective atmosphere is not required. It is not essential to preheat the aluminum strip, but a heater 28 may be used, in which event it should not be heated over about 800° F. If this temperature is exceeded, a protective atmosphere should be used.

In the prior art wherein tin aluminum alloys were directly clad to steel, relatively high steel temperatures were involved. This often caused the low melting point constituents such as tin to be squirted out, or to be deposited between the aluminum alloy layer and the steel with consequent degradation of the bond.

After the two layers have been clad together they may be re-rolled and annealed to improve the bond and to soften the aluminum, which to a certain degree has been work hardened by the severe rolling. The annealing should be at a temperature within the range 450 to 800° F., and it is only necessary to bring each portion of the strip to the proper annealing temperature for a short period of time. The annealing reticulates or spheroidizes the tin which improves the bearing properties.

Thereafter the strip can be formed into sleeve bearings by techniques known to the art, and even flange bearings can be made from the bimetal. In the manufacture of flange bearings the metal endures more severe bending than it does for non-flanged sleeve bearings.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of making a bimetallic bearing which comprises the steps of: selecting a layer of aluminum alloy consisting essentially of tin 4% to 10%, copper 0.5% to 2%, nickel 0.2% to 2%, silicon 0.2% to 8%, iron not over 0.7%, and the balance substantially aluminum; selecting a backing layer of low carbon steel; cleaning and roughening the bonding interfaces of said two layers and substantially immediately thereafter passing said layers together through pressure rolls having a temperature within the range 250–600° F. to directly bond said layers together face to face, the pressure of said rolls on said layers being such as to reduce the thickness of the aluminum layer between 40% and 70% to effect a strong metallurgical bond therebetween to form a bimetal layer, maintaining the temperature of said rolls within the range of 250–600° F.; cutting said bimetal layer into sections and forming said sections into suitable bearing shapes.

2. The method as set forth in claim 1, further characterized by annealing said formed bimetal to soften the aluminum layer thereon prior to cutting said bimetal layer into sections.

3. The method as set forth in claim 2, further characterized by annealing each portion of said bimetal layer at a temperature of 450–800° F. over a period of time.

4. The method as set forth in claim 3, further characterized in that said period of time is about five minutes.

References Cited by the Examiner
UNITED STATES PATENTS

| | | | |
|---|---|---|---|
| 2,782,498 | 2/1957 | Mushovic et al. | 29—4975 |
| 3,078,563 | 2/1963 | Gould et al. | 29—494 |
| 3,093,885 | 6/1963 | Morrison et al. | 29—149.5 |

JOHN F. CAMPBELL, *Primary Examiner.*

THOMAS H. EAGER, *Examiner.*